(12) United States Patent
Ciarrocchi

(10) Patent No.: US 10,472,128 B2
(45) Date of Patent: Nov. 12, 2019

(54) HANGING CONDIMENT CUP WITH LID

(71) Applicant: Robert David Ciarrocchi, Holland, PA (US)

(72) Inventor: Robert David Ciarrocchi, Holland, PA (US)

(*) Notice: Subject to any disclaimer, the term of this patent is extended or adjusted under 35 U.S.C. 154(b) by 0 days.

(21) Appl. No.: 14/802,575

(22) Filed: Jul. 17, 2015

(65) Prior Publication Data

US 2016/0015194 A1 Jan. 21, 2016

Related U.S. Application Data

(60) Provisional application No. 62/026,273, filed on Jul. 18, 2014.

(51) Int. Cl.
*B65D 21/02* (2006.01)
*B65D 25/22* (2006.01)

(52) U.S. Cl.
CPC ..... *B65D 21/0209* (2013.01); *B65D 21/0219* (2013.01); *B65D 25/22* (2013.01); *Y02W 90/13* (2015.05)

(58) Field of Classification Search
CPC ........ B65D 21/02; B65D 25/22; B65D 43/02; B65D 43/0208; A47G 19/04; A47G 19/18
USPC .................................................. 220/780, 781
See application file for complete search history.

(56) References Cited

U.S. PATENT DOCUMENTS

| 963,065 | A | | 7/1910 | Pringle | |
|---|---|---|---|---|---|
| 1,948,932 | A | * | 2/1934 | McMickle | A47G 19/22 126/380.1 |
| 2,314,835 | A | * | 3/1943 | Johns | A47J 47/18 206/514 |
| 5,429,262 | A | * | 7/1995 | Sharkey | A47G 19/04 220/23.4 |
| 6,076,700 | A | * | 6/2000 | Manges | B65D 67/02 220/23.4 |
| 6,170,696 | B1 | * | 1/2001 | Tucker | B65D 1/26 206/508 |
| D452,149 | S | | 12/2001 | Nance | |
| D466,013 | S | | 11/2002 | Nance | |
| D466,407 | S | | 12/2002 | Nance | |
| 8,061,545 | B2 | * | 11/2011 | Roth | B65D 21/0204 206/217 |
| 8,443,996 | B2 | | 5/2013 | Ciarrocchi | |
| 2003/0019871 | A1 | * | 1/2003 | Nance | A47G 19/04 220/23.4 |

(Continued)

OTHER PUBLICATIONS

Dictionary Definition of "Integral" by Merriam-Webster, Feb. 18, 2019 (Year: 2019).*

(Continued)

*Primary Examiner* — Andrew T Kirsch
(74) *Attorney, Agent, or Firm* — Volpe and Koenig, P.C.

(57) ABSTRACT

A hanging condiment cup with at least one integral clip and a removable lid that attaches to a food container. The condiment cup has a convex end and a concave end, with the convex end having a radius that matches the food container it attaches to. The condiment cup also has a backslant that matches the slant of the food container to bring the center of gravity of the condiment cup closer to the center of the food container for increased stability. The condiment cup and lid are designed to be stacked and are made from biodegradable or other plastic material that is refrigerator, heat and/or microwave safe.

8 Claims, 23 Drawing Sheets

(56) References Cited

U.S. PATENT DOCUMENTS

2005/0236415 A1* 10/2005 Ozasa ..................... B32B 5/18
                                                        220/574
2013/0020332 A1*  1/2013 Zox ....................... A47G 19/06
                                                        220/574
2013/0277375 A1* 10/2013 Hickox .............. A47G 23/0633
                                                        220/575

OTHER PUBLICATIONS

Dictionary Definition of "Integral" by Dictionary.com, Feb. 18, 2019 (Year: 2019).*
"Standard EN 13432: Proof of Compostability of Plastic Products", Biodegradable Products Institute, Inc., New York, NY, 2013.

* cited by examiner

US 10,472,128 B2

HANGING CONDIMENT CUP WITH LID

CROSS REFERENCE TO RELATED APPLICATION(S)

This application claims the benefit of U.S. Provisional Application No. 62/026,273 filed Jul. 18, 2014, which is incorporated by reference as if fully set forth.

FIELD OF INVENTION

The present invention relates to the field of containers for condiments and to the attachment of condiment containers to food packages.

BACKGROUND

Hanging condiment containers that attach a condiment cup to a food container are known in the art. With any food container that has a hanging condiment cup attached, it is important that the combined center of gravity of the container and cup remains within the perimeter of the base of the food container. As food is taken out of the container and consumed by the user, the weight of the food container will decrease and the center of gravity will move towards the condiment cup. If the center of gravity moves far enough towards the condiment cup that it is outside of the perimeter of the base of the container, the container will flip onto its side. Accordingly there is a need for a hanging condiment cup that keeps the center of gravity relatively close to the center of the food container, even when food is removed from the food container.

SUMMARY

A condiment cup having at least one integral clip for attachment to the upper rim of a food container is described. The use of at least one clip to attach the condiment cup to the food container provides stability to a food container preventing the cup from shifting or falling during movement. The addition of a second clip increased effectiveness by preventing the shifting, falling, or being accidentally knocked off during transportation or use. It would also allow for easier attachment by the worker as the single clip is hidden in the curvature of the condiment cup. The presence of two clips eliminates these issues. The use of at least one clip also provides mobility to the consumer by combing the condiment cup and food container into one unit, enabling a consumer to use the non-carrying hand for other things. The condiment cup is attached to the top rim of the food container making the top rim of the condiment cup substantially level with the top rim of the food container. This arrangement allows the consumer to more easily remove food from the food container and dip in to the condiment container. Further, this arrangement also allows a consumer to avoid dipping unintended items in the food container, such as shirt sleeves or jewelry when removing food from the container. The interior radius of the back of the condiment cup is substantially similar to that of the food container and the condiment cup also has a backslant that is substantially similar to the slant of the food container. The backslant causes the back of the condiment cup to hang at a 90 degree angle to the side of the food container. Once the condiment cup is attached to the food container, both the radius and the backslant of the condiment cup offer stability to the food container by bringing the center of gravity of the cup inward toward the center of the food container. By bringing the center of gravity of the condiment cup in toward the center of the food container, the food container and condiment cup combined are more balanced and stable, to reduce the risk of the container from toppling over as the food container is emptied by the consumer. The condiment cup may also have a removable lid with a pull tab to enable the consumer to easily open the condiment cup. Having a removable lid on the condiment cup enables the cups prepared in advance and easily stacked upon on another. A sealed foil lid, or a lid of a similar material to the cup, on the condiment cup prevents spilling or leaking of the condiment prior to consumption. The condiment cup may be made of a biodegradable material that may be refrigerator, heat and/or microwave safe with a temperature resistance from −20° C. (−4° F.) to 120° C. (248° F.). The temperature resistance would vary according to the type of material used to the hanging condiment cup.

BRIEF DESCRIPTION OF THE DRAWINGS

A more detailed understanding may be had from the following description, given by way of example in conjunction with the accompanying drawings herein.

FIG. 1 shows the back of the hanging condiment cup with two integral clips and a radius angled to match that of the food container it hangs on;

DETAILED DESCRIPTION OF THE PREFERRED EMBODIMENTS

Various embodiments are described herein where like references to figures are used to describe like features. Each feature or element may be used alone without other features and elements or in various combinations with or without other features and elements.

The hanging condiment container discussed herein provides the consumer with a condiment container that, when attached to a food container, results in a stable, balanced, and easy way to enjoy food and condiments that reduces the risk of the food container toppling over as its contents are consumed.

The terms hanging condiment cup and condiment cup are used interchangeably as described herein. The terms removable lid and lid are used interchangeably as described herein. The terms integral clip(s) and clip(s) are used interchangeably as described herein.

Figure 1:
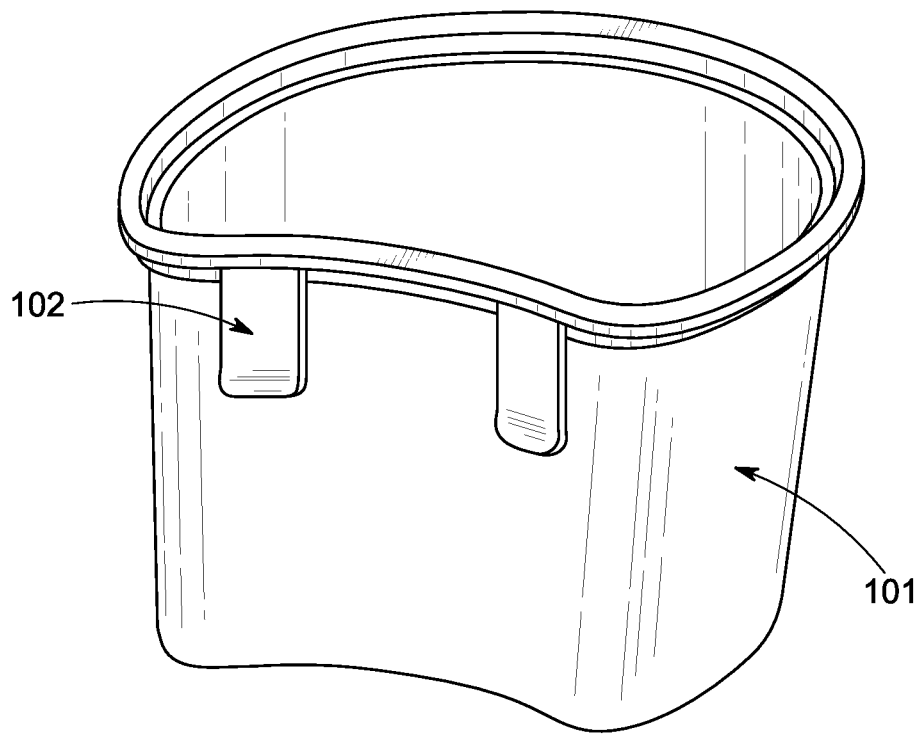

FIG. 1 shows the back of the hanging condiment cup with two integral clips and an angled radius that is substantially similar to that of the food container it hangs on. The condiment cup 101 having at least one integral clip 102 may be used to hang condiments from the side of food containers. The radius of the condiment cup may match the radius of the food container it hangs on.

Figure 2:
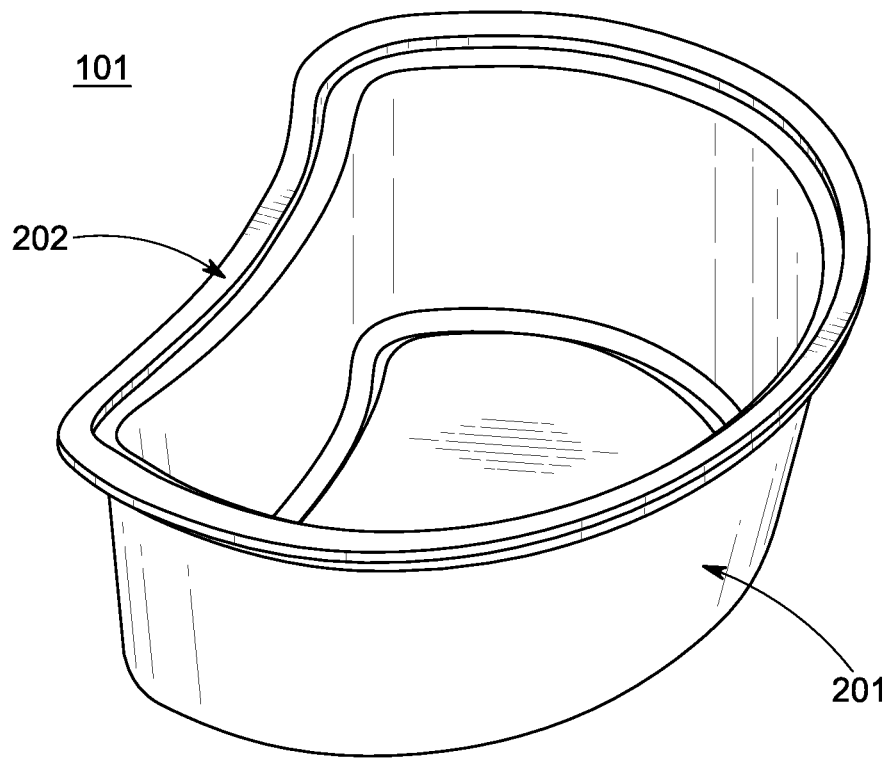
FIG. 2 shows a top view of the condiment cup with a front interior convex angel and a back interior concave angle.

FIG. 2 shows a top view of the condiment cup with a front interior convex angle and a back interior concave angle. The hanging condiment cup 101 may have a concave front side 201 that faces away from food container and a convex back side 202 that is in contact with food container. The integral clip (102 as shown in FIG. 1) or clips are located on the convex back side 202 of the hanging condiment cup 101.

Figure 3:
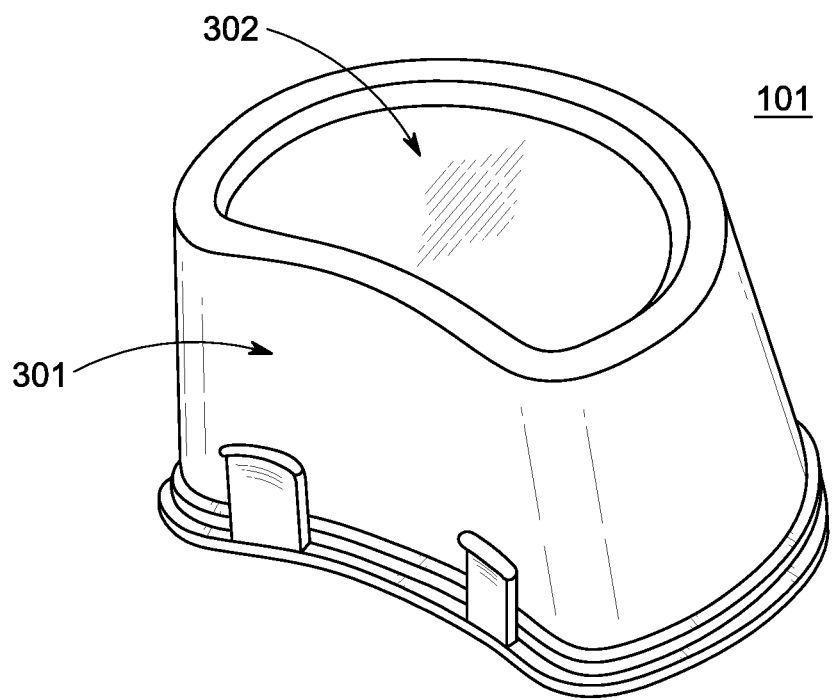
FIG. 3 shows the bottom of the condiment cup with the forward slanted front side and a back slanted back side of the condiment cup with two integral clips for attachment.

FIG. 3 shows the bottom of the condiment cup with the forward slanted front side and a back slanted back side of the condiment cup with two integral clips for attachment. The hanging condiment cup 101 has a backslant 301 which is substantially similar to the inward slant of the food container, thereby bringing the back of the hanging condiment cup 101 into contact with the side of the food container. The backslant 301 element of the hanging condiment cup 101 enables the center of gravity of the combined food container and hanging condiment cup 101 to remain inside the food container, thereby reducing the risk of the food container from falling over as the internal volume of food decreases. The backslant 301 element may match the inward slant of the food container.

In an embodiment, the radius of the convex back side of the hanging condiment cup 101 is substantially similar to that of the food container.

In an embodiment, a portion of the center of the base of the hanging condiment cup 101 is raised up into the inside center of the cup 302 to enable cups to be easily stacked. The raised indentation 302 on the base of the hanging condiment cup 101 enables the cups to be nested/stacked to reduce surface area and square footage, thereby decreasing the volume of the outer packaging for transportation to customers.

Figure 4:
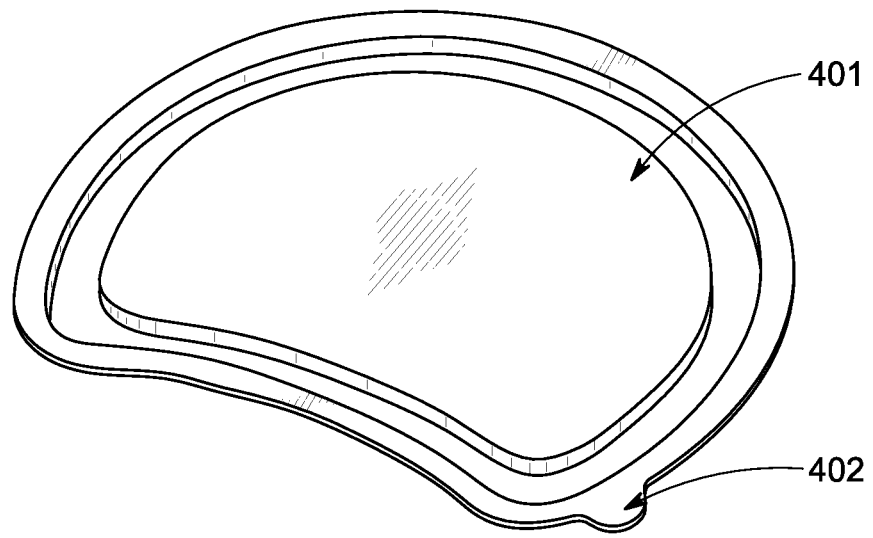
FIG. 4 shows the top side of a removable lid with a pull tab for the condiment cup.

FIG. 4 shows the top side of a removable lid with a pull tab for the hanging condiment cup. In another embodiment, the hanging condiment cup 101 may have a removable lid 401 with a pull tab 402 for easy removal of the lid 401. In this example the removable lid 401 fits around a lip of the hanging condiment cup 101 (not shown). In an alternative embodiment, the removable lid 402 may fit inside a lip of the hanging condiment cup 101 (not shown).

Figure 5:
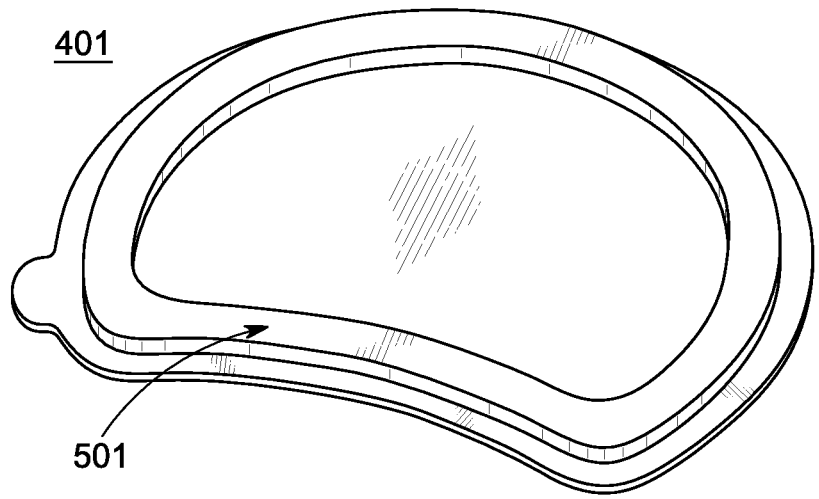
FIG. 5 shows the bottom side of a removable lid with a pull tab for the condiment cup.

FIG. 5 shows the bottom side of a removable lid with a pull tab for the hanging condiment cup. The removable lid 401 may have an indented rim 501 that fits along the inside perimeter of the hanging condiment cup 101 to ensure a snug fit on the cup and to enable full condiment cups to be easily stacked.

Figure 6:
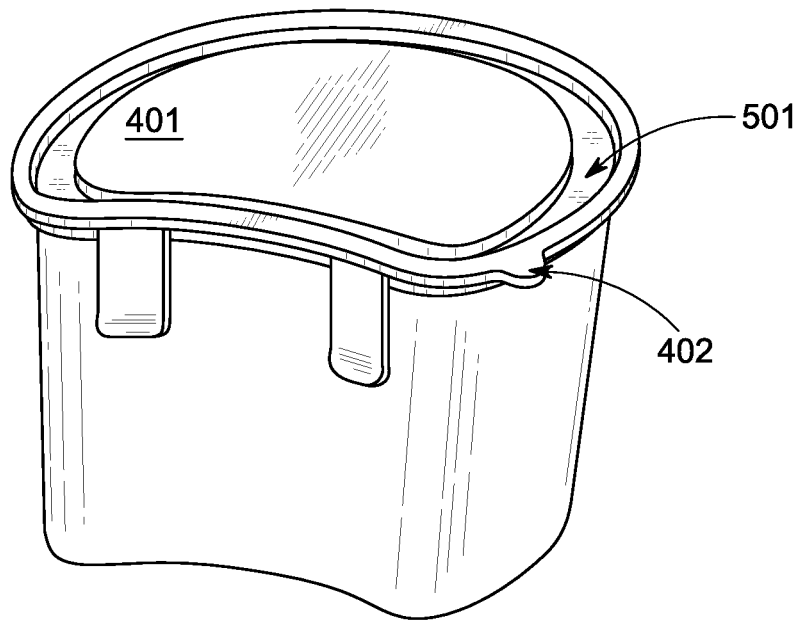
FIG. 6 shows the backslanted side of the condiment cup with two integral clips and a removable lid with a pull tab.

FIG. 6 shows the backslanted side of the condiment cup with two integral clips and a removable lid with a pull tab. The indented rim design 501 allows the lids 401 to be nested/stacked to reduce surface area and square footage, thereby decreasing the volume of the outer packaging for transportation to customers.

Figure 7:
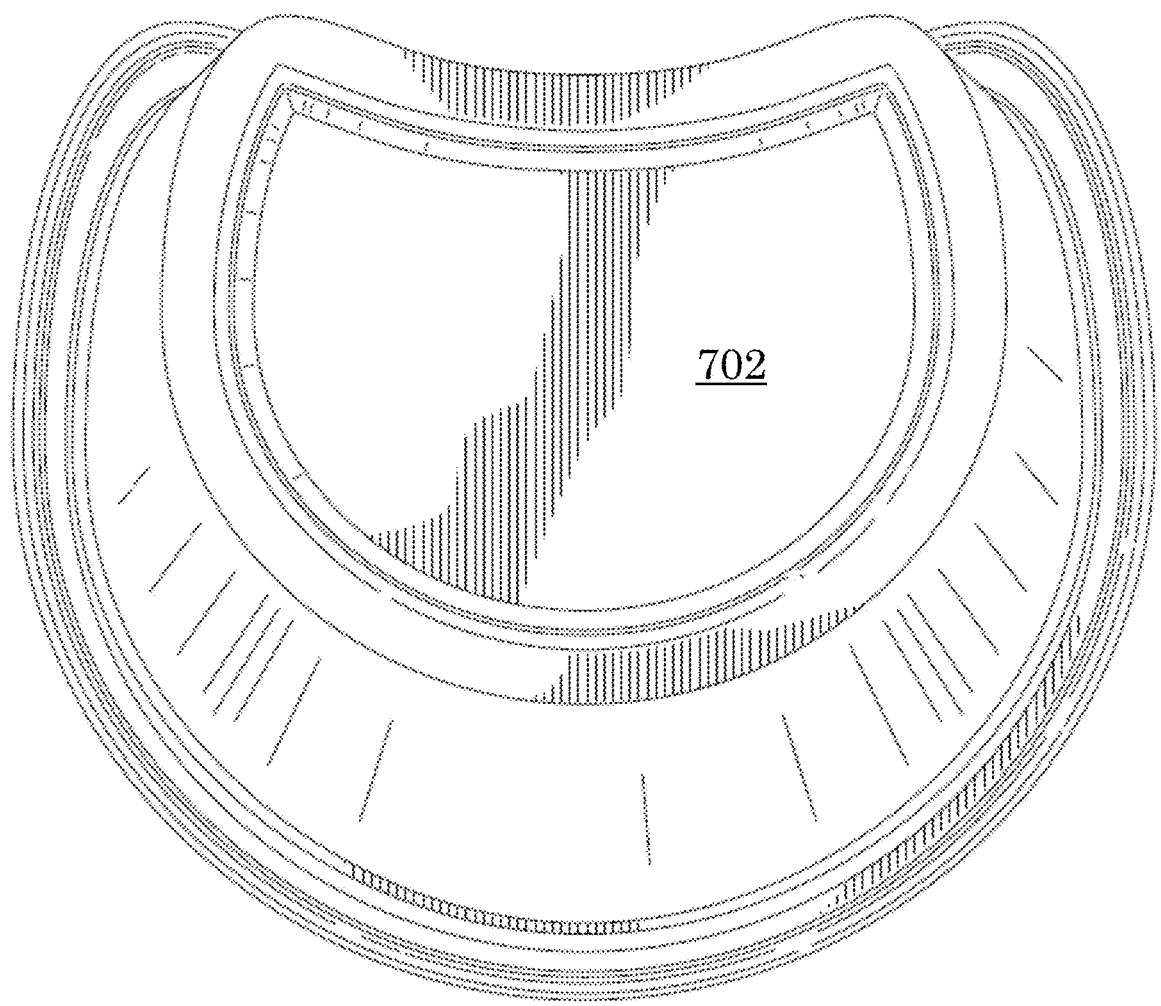
FIG. 7 shows the bottom side of the condiment cup with an indented portion of the center of the base of the cup is raised up into the inside center of the cup, for ease of stacking cups on one another.

FIG. 7 shows the bottom side of the condiment cup with an indented portion of the center of the base of the cup is raised up into the inside center of the cup, for ease of stacking cups on one another. In FIG. 7, the condiment cup 701 has an indented portion 702. The indented portion 702 is raised into the inside center of the condiment cup 701. This indented portion 702 allows easy stacking of the condiment cups on one another.

Figure 8:
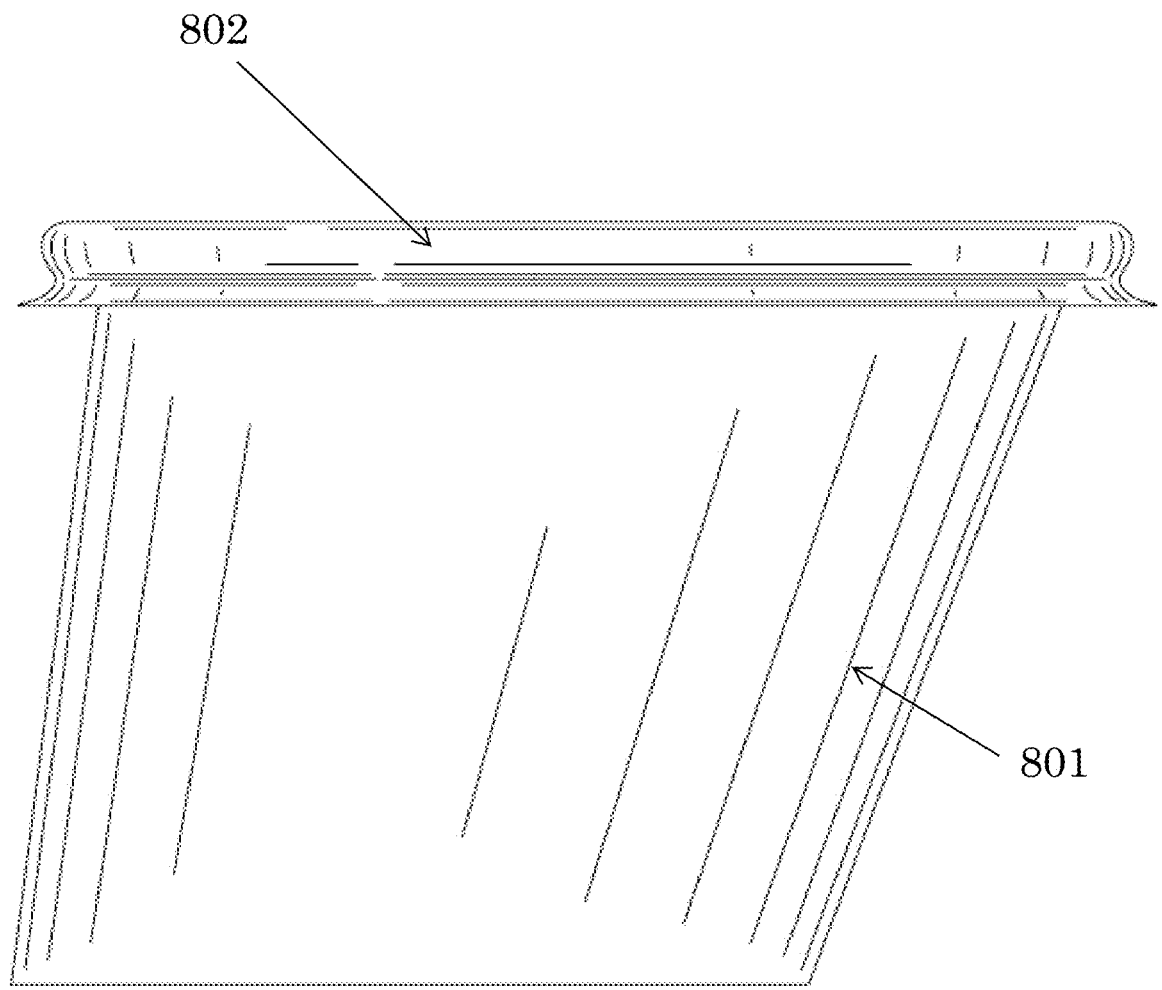
FIG. 8 is a side view of the condiment cup showing the backslant of the cup, with a removable lid.

FIG. 8 is a side view of the condiment cup showing the backslant of the cup with a removable lid. The condiment cup 801 has removable lid 802. The condiment cup 801 has a backslant that is substantially similar to the inward slant of the food container to bring the condiment cup 801 into contact with the side of the food container.

Figure 9:
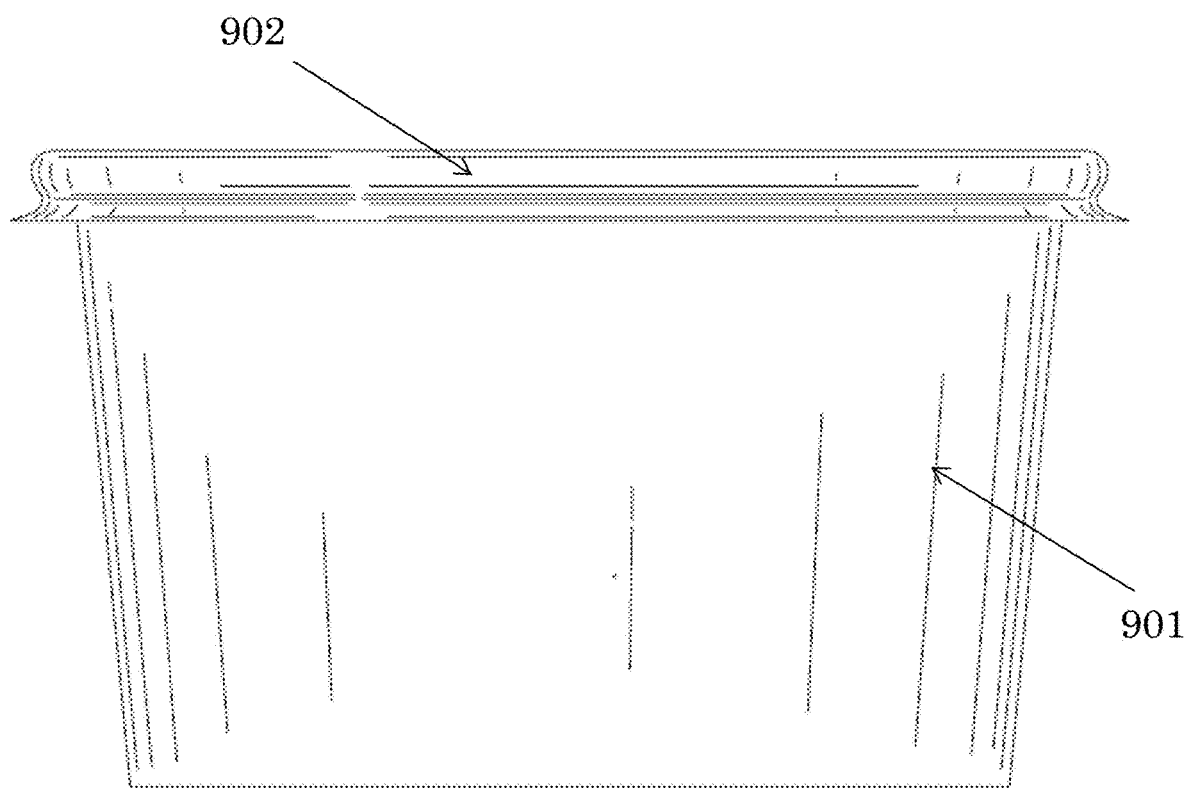
FIG. 9 shows a front view of the condiment cup with a removable lid.

FIG. 9 shows a front view of the condiment cup with a removable lid. The condiment cup 901 has a removable lid 902.

Figure 10:
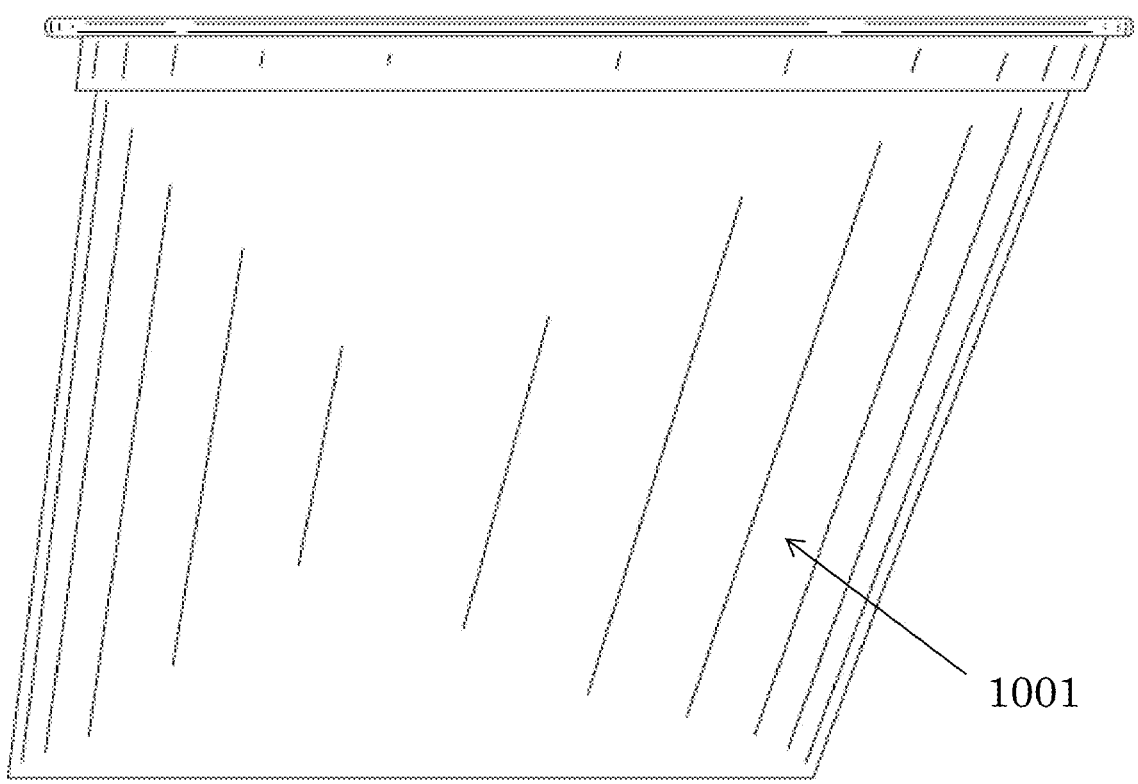
FIG. 10 shows a side view of the condiment cup showing the backslant, without the removable lid.

FIG. 10 shows a side view of the condiment cup showing the backslant without the removable lid. The side view of condiment cup 1001 has a backslant that is substantially similar to the inward slant of the food container to bring the condiment cup 1001 into contact with the side of the food container.

Figure 11:
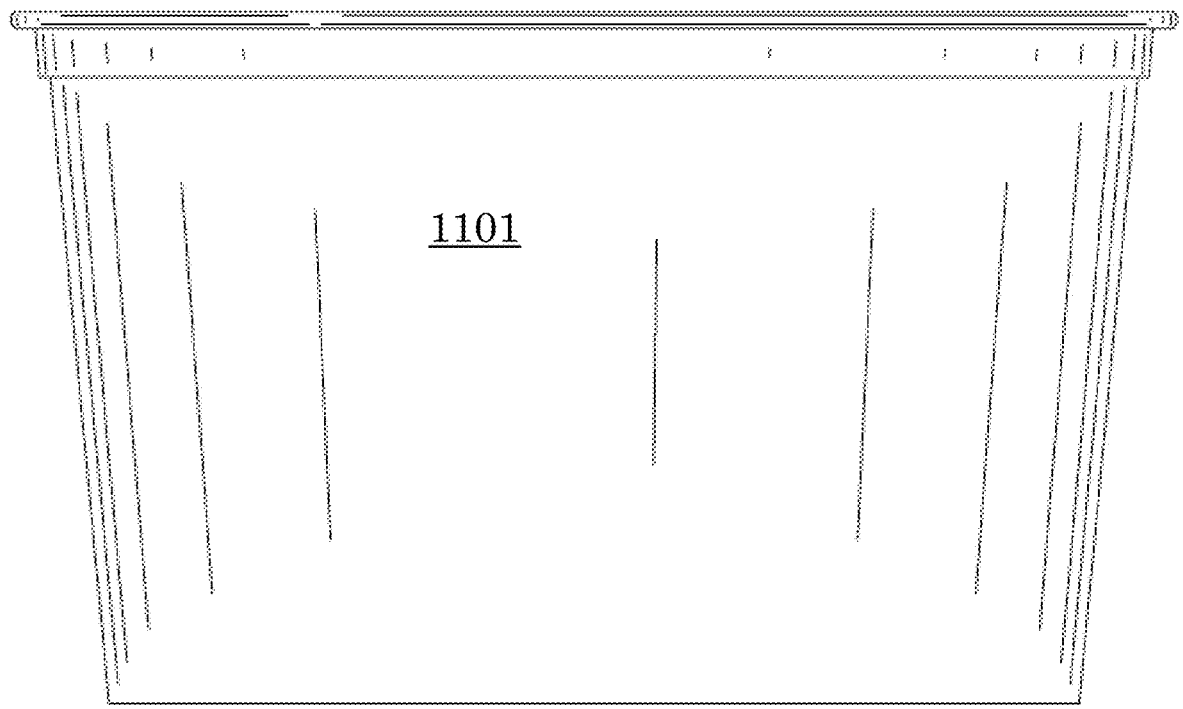
FIG. 11 shows the front view of the condiment cup without the removable lid.

FIG. 11 shows the front view of the condiment cup without the removable lid. The condiment cup 1101 of FIG. 11 is shown without the removable lid.

Figure 12:
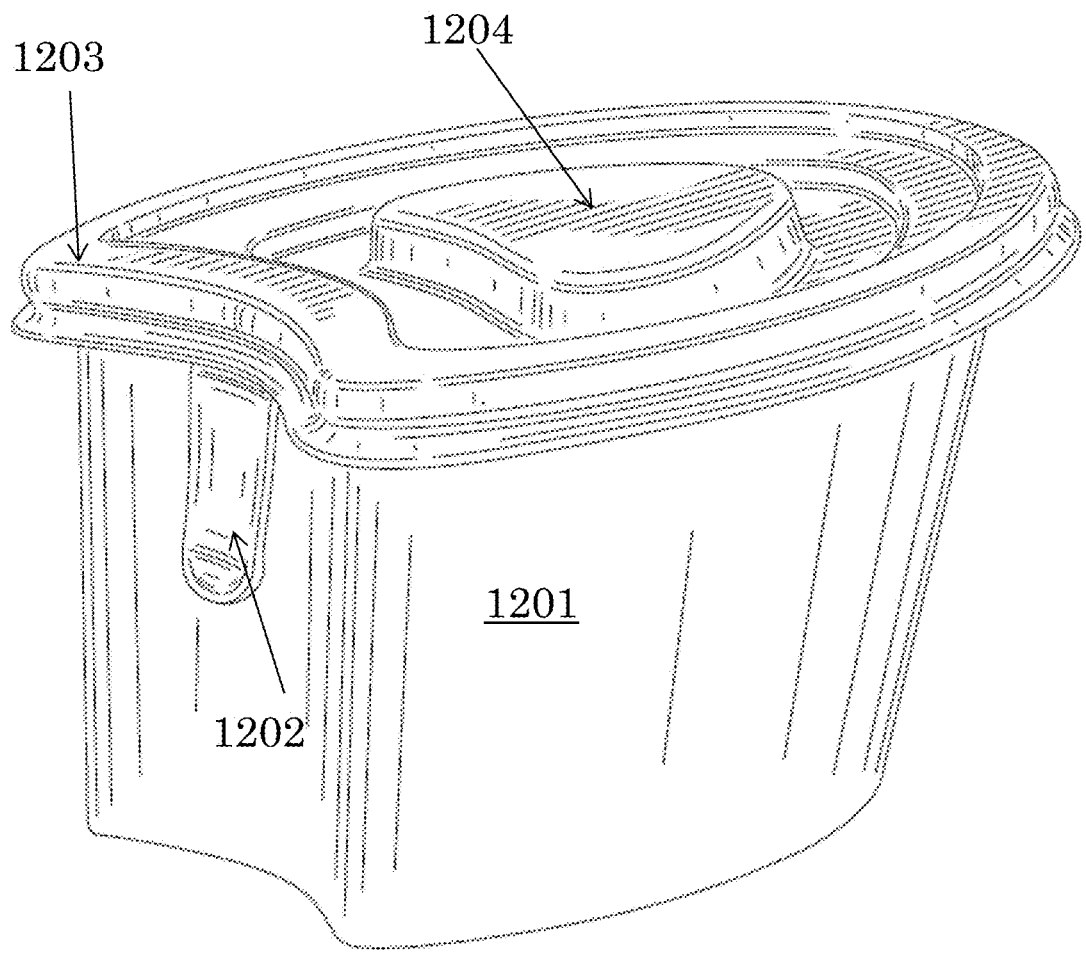
FIG. 12 shows a side and back view of the condiment cup with an embodiment of the removable lid having a raised center.

FIG. 12 shows a side and back view of the condiment cup with an embodiment of the removable lid having a raised center. The condiment cup 1201 has a single clip 1202. The removable lid 1203 has a raised center 1204. The raised center 1204 allows for nesting of the removable lids when stacked.

Figure 13:
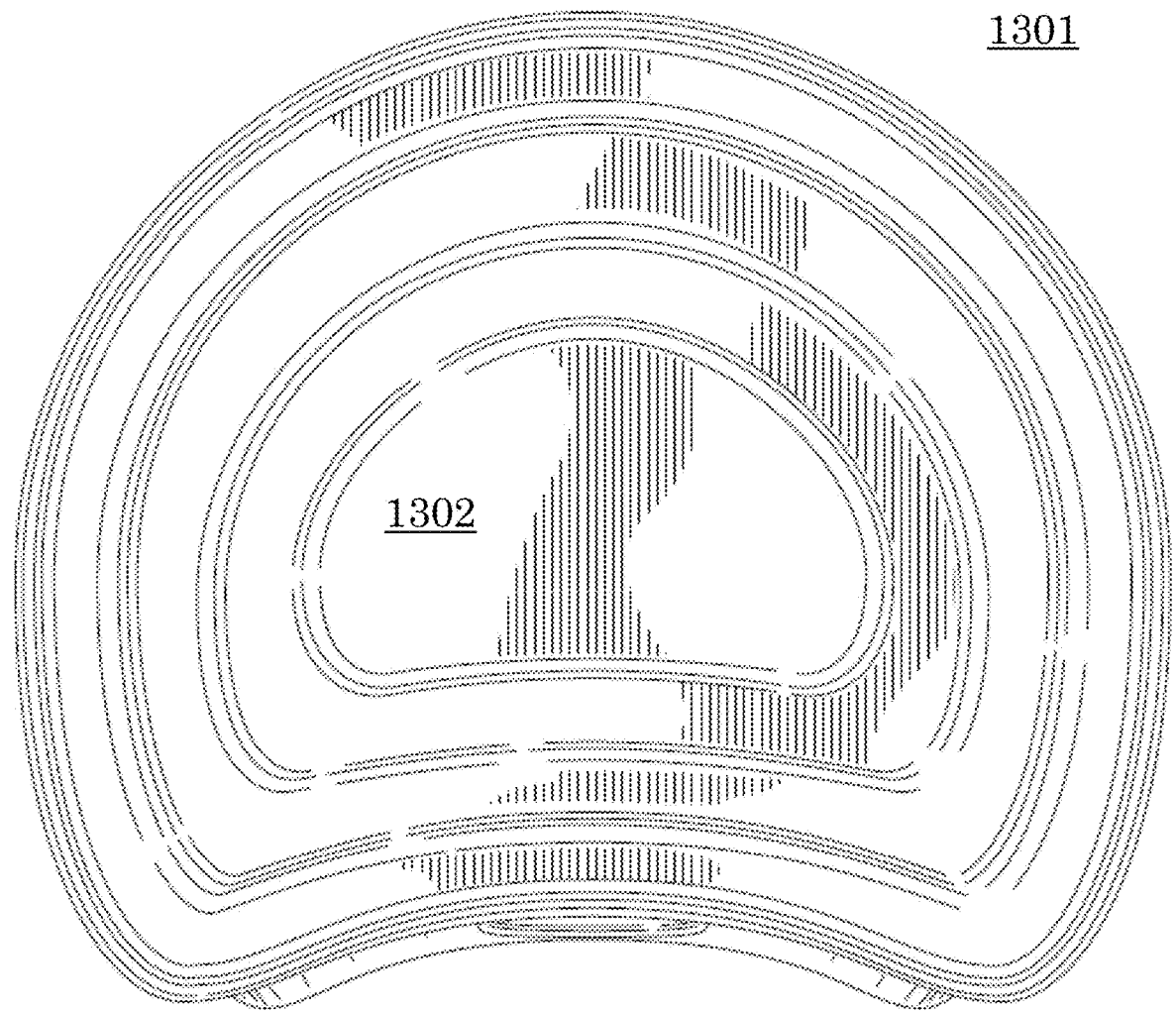
FIG. 13 shows a top view of an embodiment of the removable lid on the condiment cup.

FIG. 13 shows a top view of an embodiment of the removable lid on the condiment cup. The removable lid 1301 includes a raised center 1302.

Figure 14:
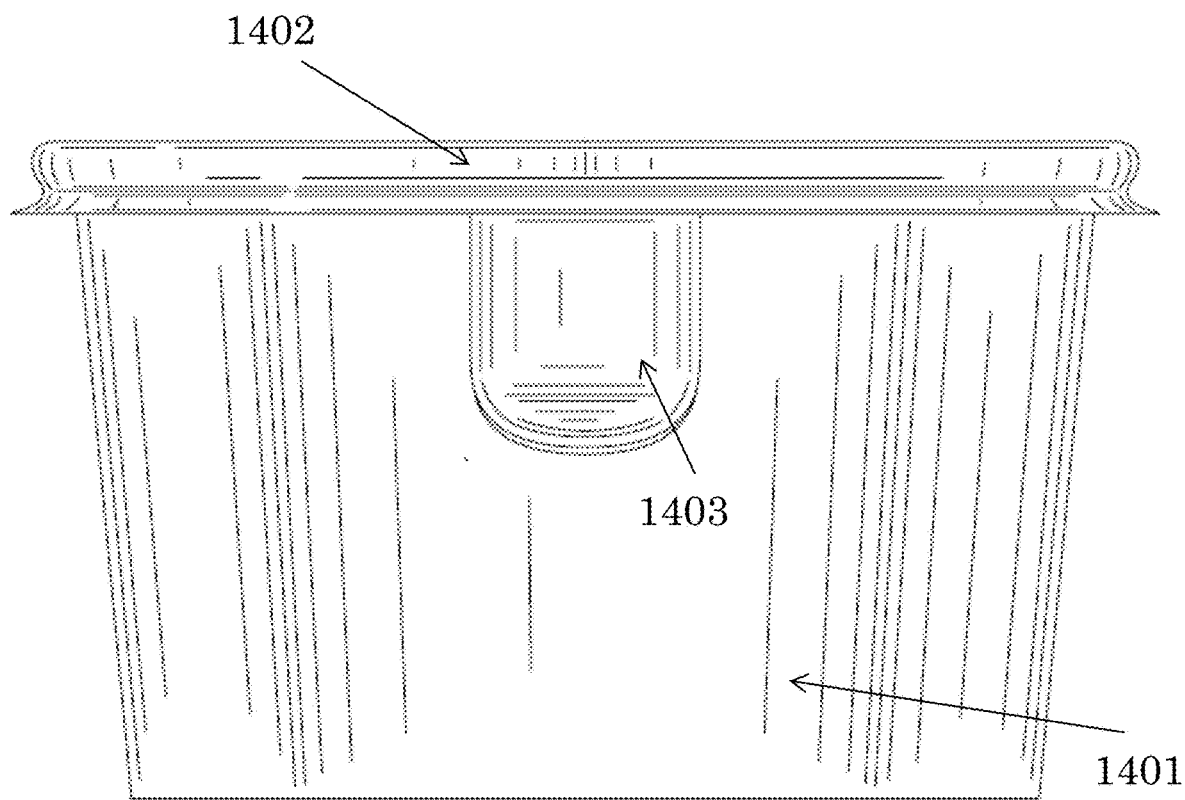
FIG. 14 shows a view of the condiment cup and removable lid with the condiment cup having one clip.

FIG. 14 shows a view of the condiment cup and removable lid with the condiment cup having one clip. The condiment cup 1401 has a removable lid 1402 and a single clip 1403. The single clip 1403 is used to attach the condiment cup 1401 to the food container.

Figure 15:
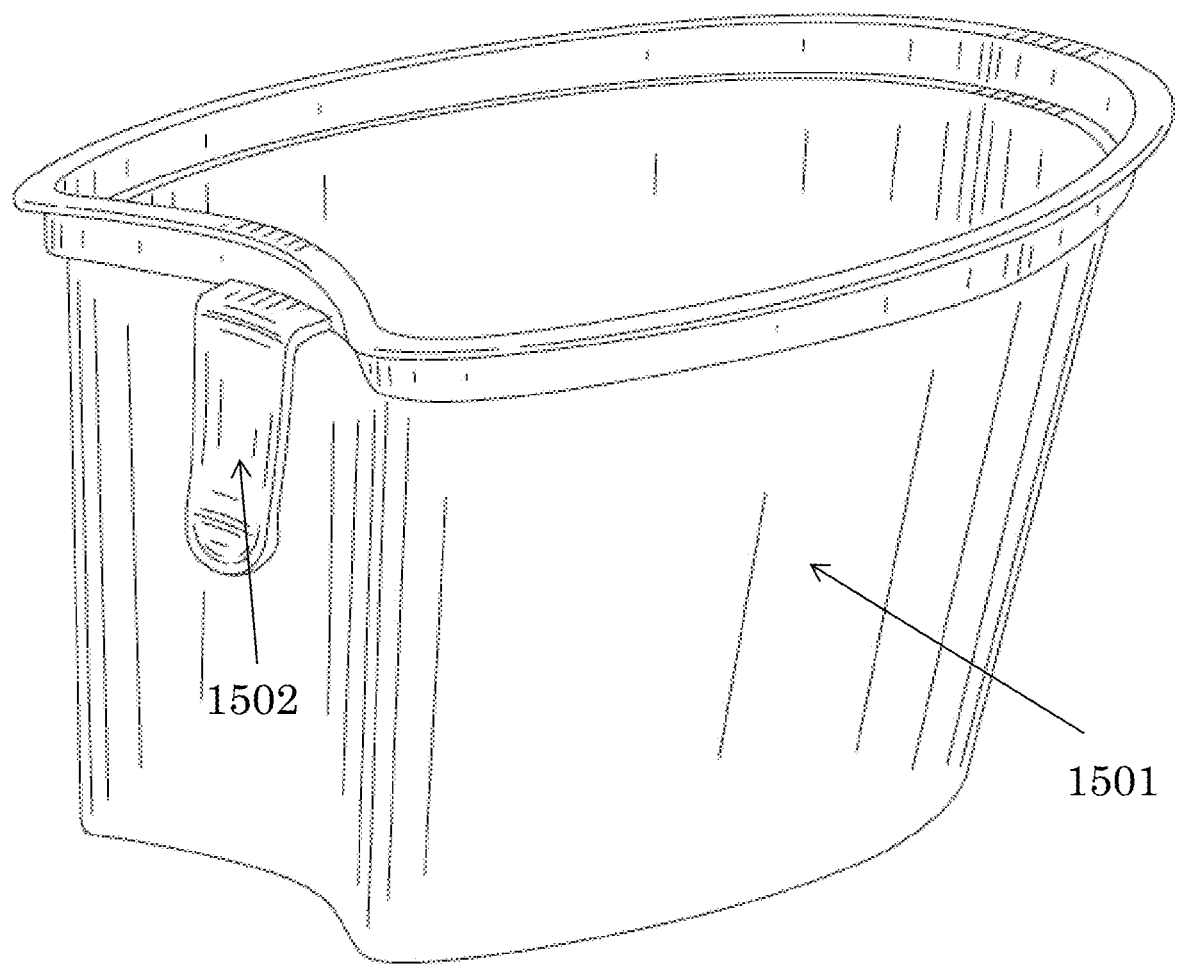
FIG. 15 shows a side and backslant view of the condiment cup with one clip.
Figure 16:
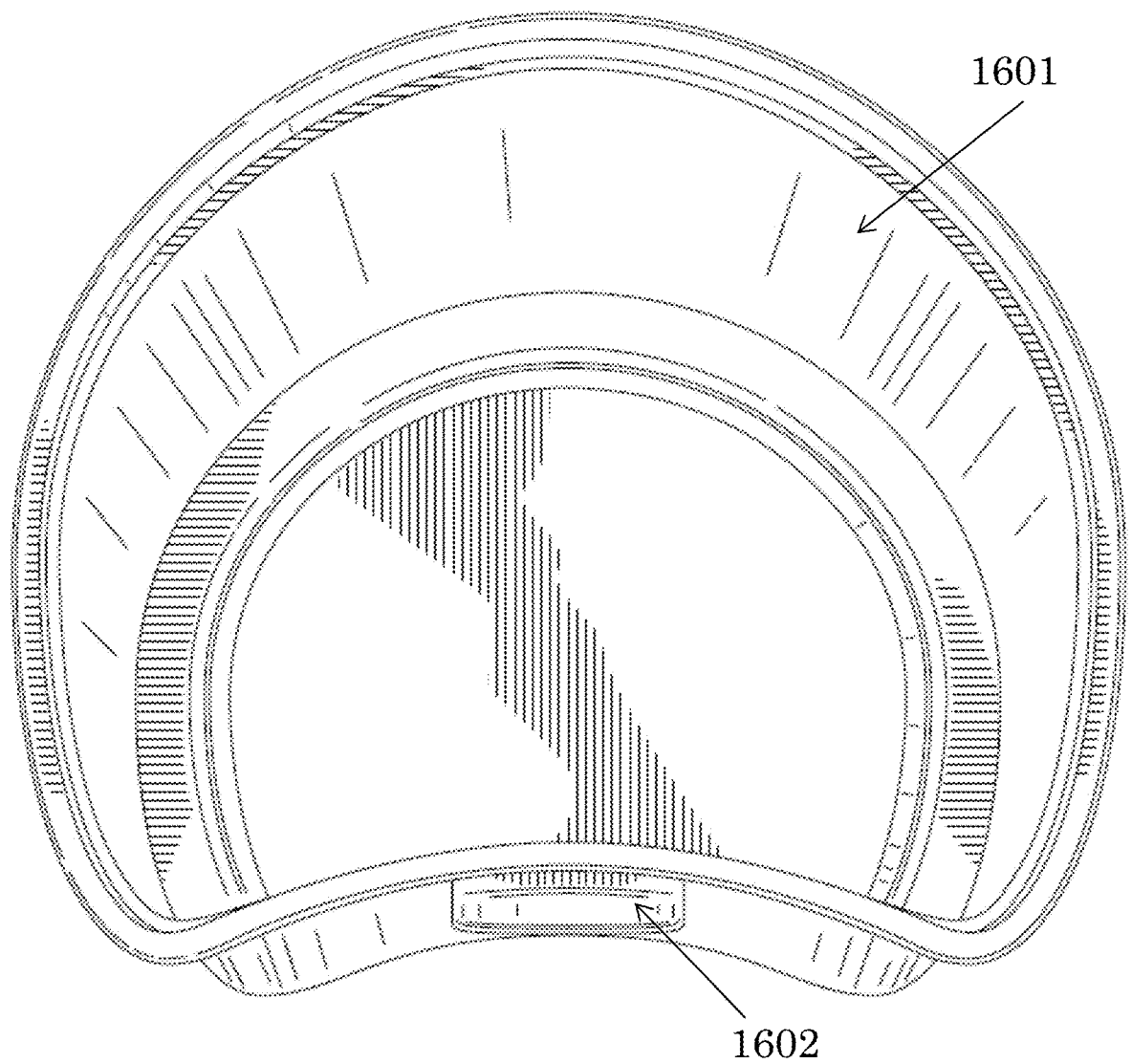
FIG. 16 is a top view of an embodiment of the condiment cup showing the interior of the condiment cup with one clip.

FIG. 15 shows a side and backslant view of the condiment cup with one clip. The condiment cup 1501 has a single clip 1502. The condiment cup 1501 has a back slant that is substantially similar to the inward slant of the food container to bring the condiment cup 1501 into contact with the side of the food container FIG. 16 is a top view of an embodiment of the condiment cup showing the interior of the condiment cup with one clip. The condiment cup 1601 has on clip 1602 for attaching the condiment cup 1601 to the food container.

Figure 17:
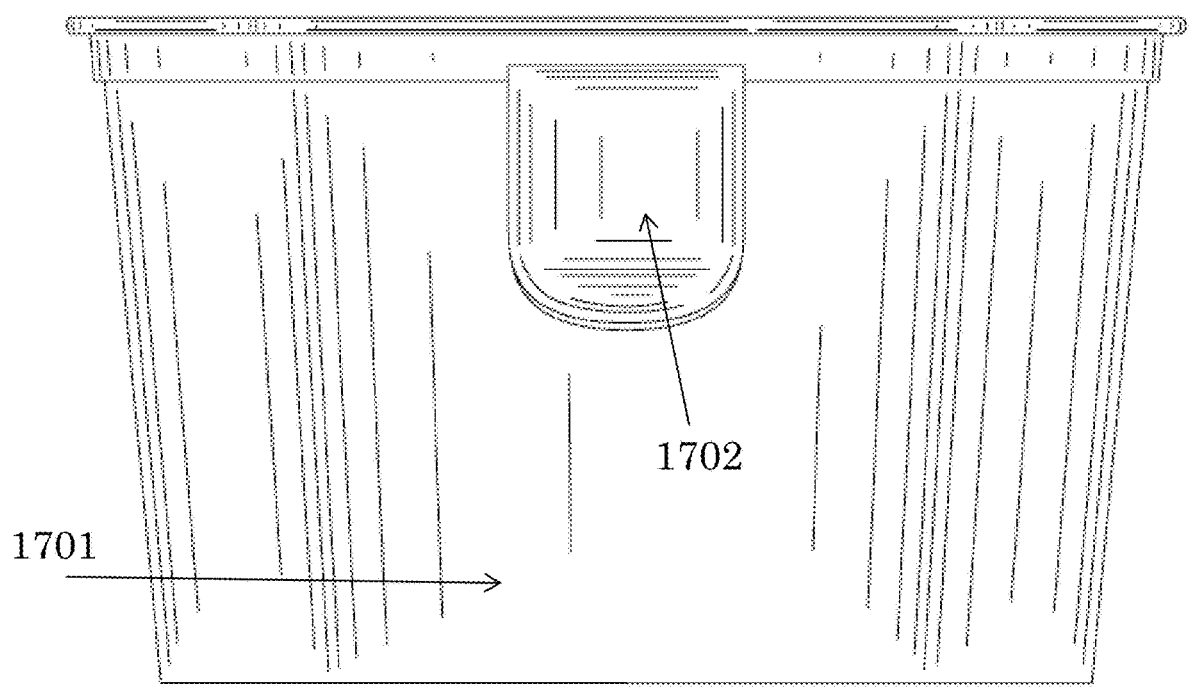
FIG. 17 shows the backslanted side of the condiment cup with one clip.

FIG. 17 shows the backslanted side of the condiment cup with one clip. The condiment cup 1701 has a backslanted side with one clip 1702.

Figure 18:
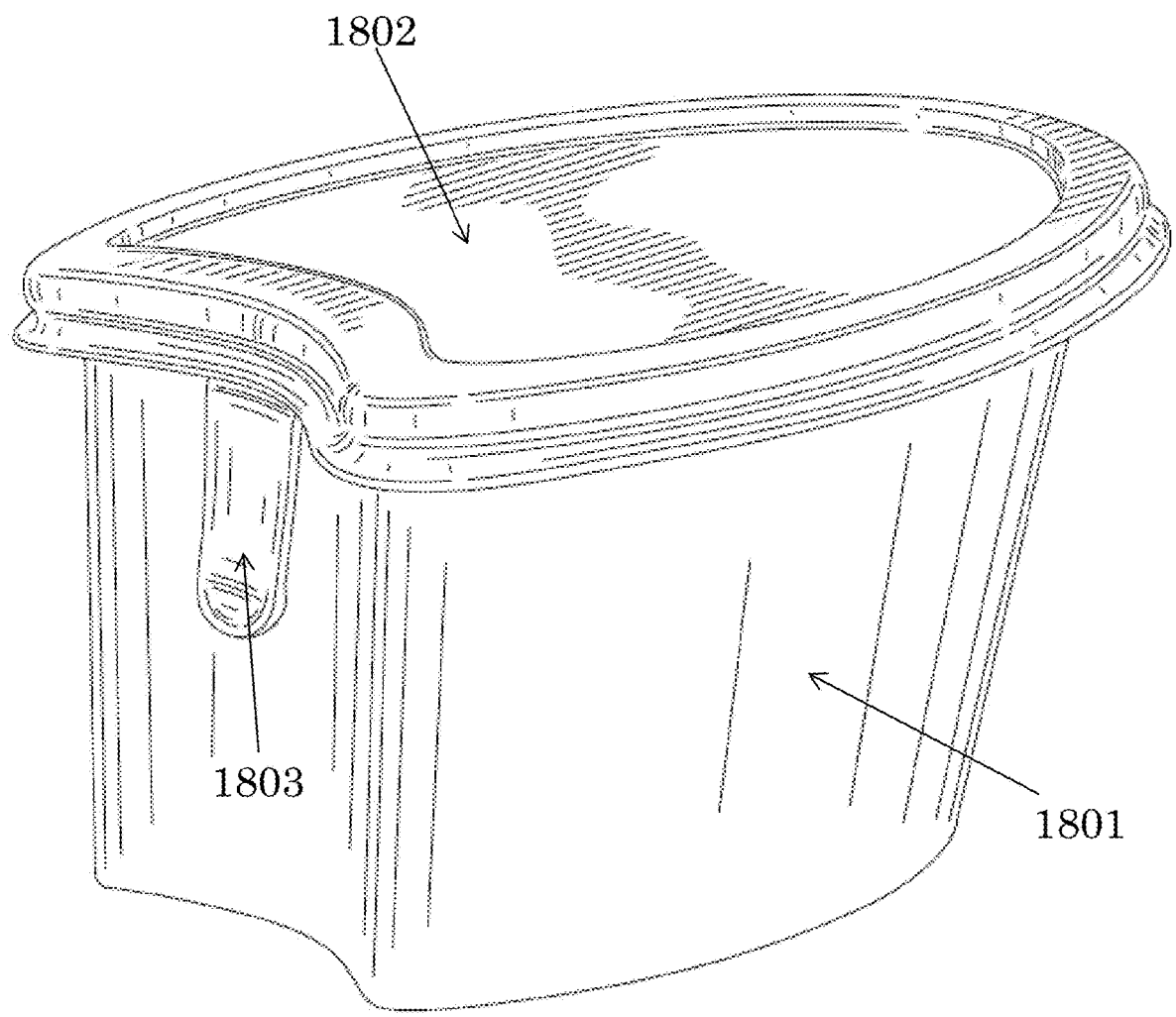
FIG. 18 shows an embodiment of the removable lid of the condiment cup.

FIG. 18 shows an embodiment of the removable lid with the condiment cup. The condiment cup 1801 has a removable lid 1802. The condiment cup 1801 has a back slant that is substantially similar to the inward slant of the food container to bring the condiment cup 1801 into contact with the side of the food container. The condiment cup 1801 has one clip 1803.

Figure 19:
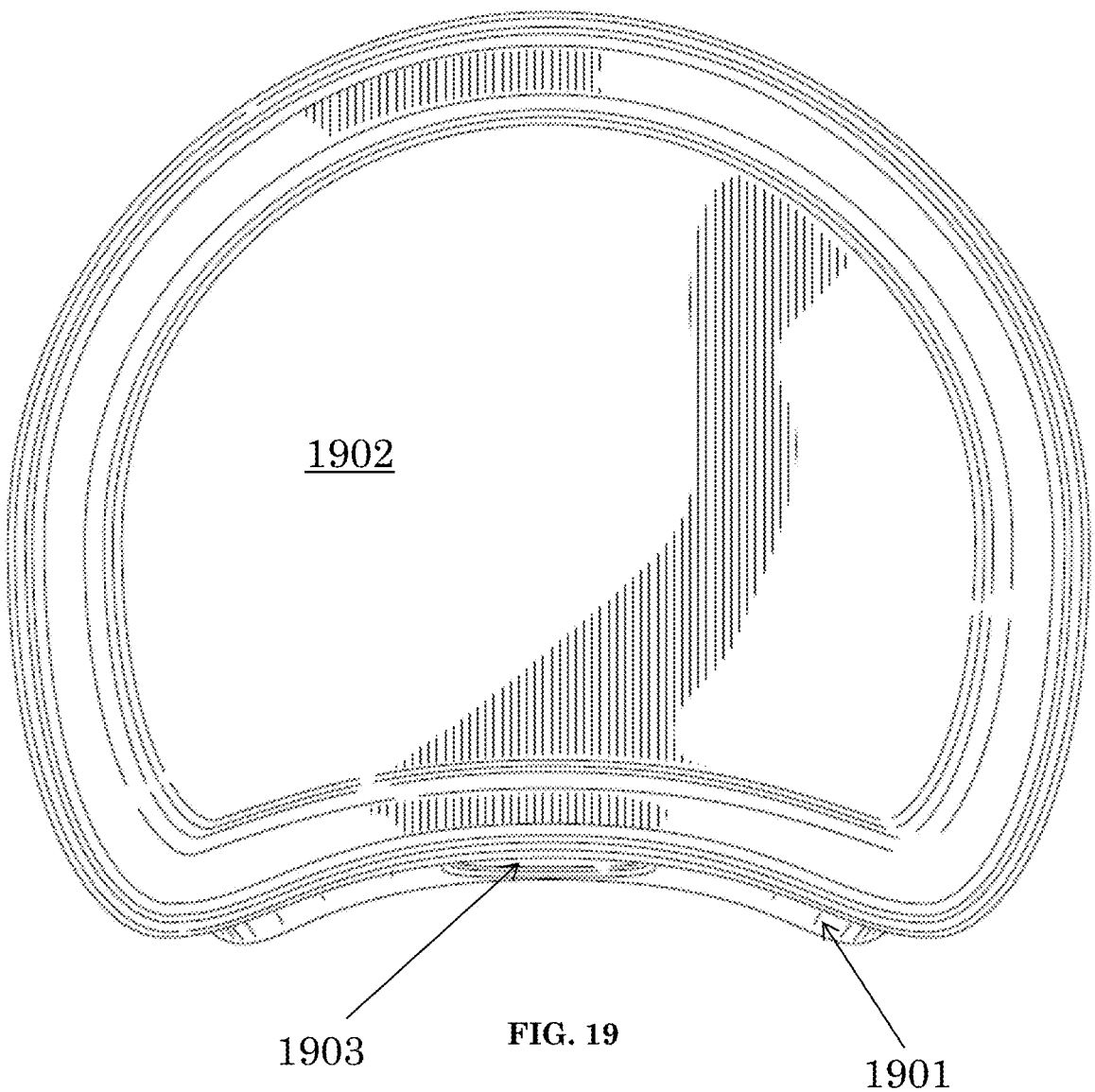
FIG. 19 shows a top view of an embodiment of the removable lid of the condiment cup.

FIG. 19 shows a top view of an embodiment of the removable lid of the condiment cup. The condiment cup 1901 has a removable lid 1902 and a one clip 1903.

Figure 20:
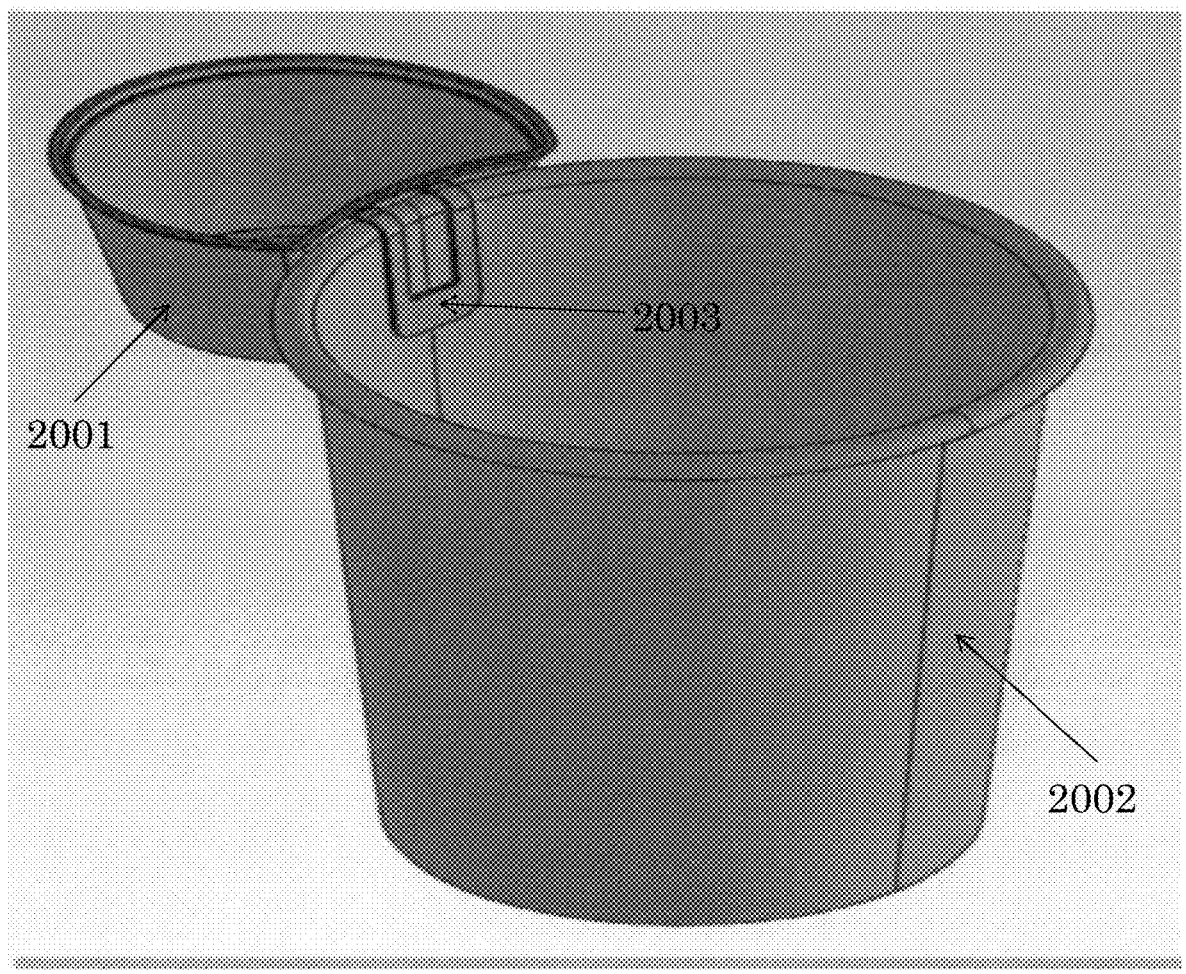
FIG. 20 shows a food container with a condiment cup hanging from the side.

FIG. 20 shows a food contained with a condiment cup hanging from the side. The condiment cup 2001 hangs on the food container 2002 using the one clip 2003. The condiment cup 2001 has a back slant that is substantially similar to the inward slant of the food container 2002 to bring the condiment cup 2001 into contact with the side of the food container 2002.

Figure 21:
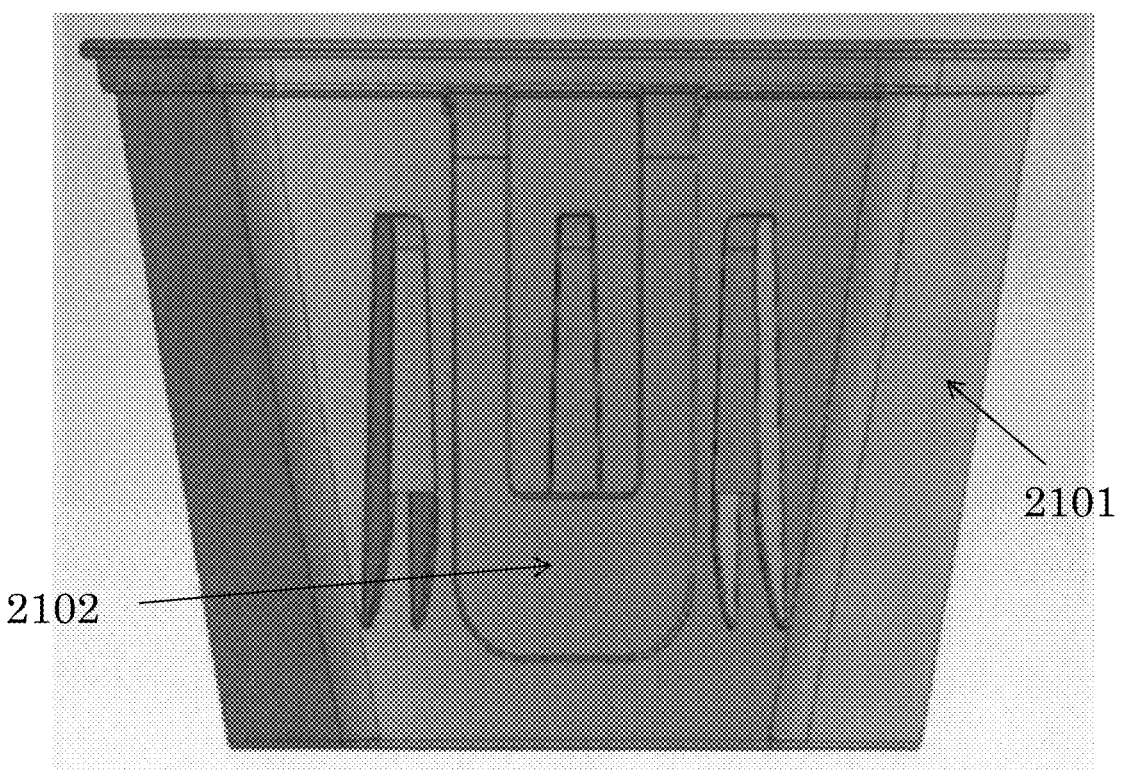
FIG. 21 shows an embodiment of the clip on the condiment cup.

FIG. 21 shows an embodiment of the clip on the condiment cup. The condiment cup 2101 has one clip 2102.

Figure 22:
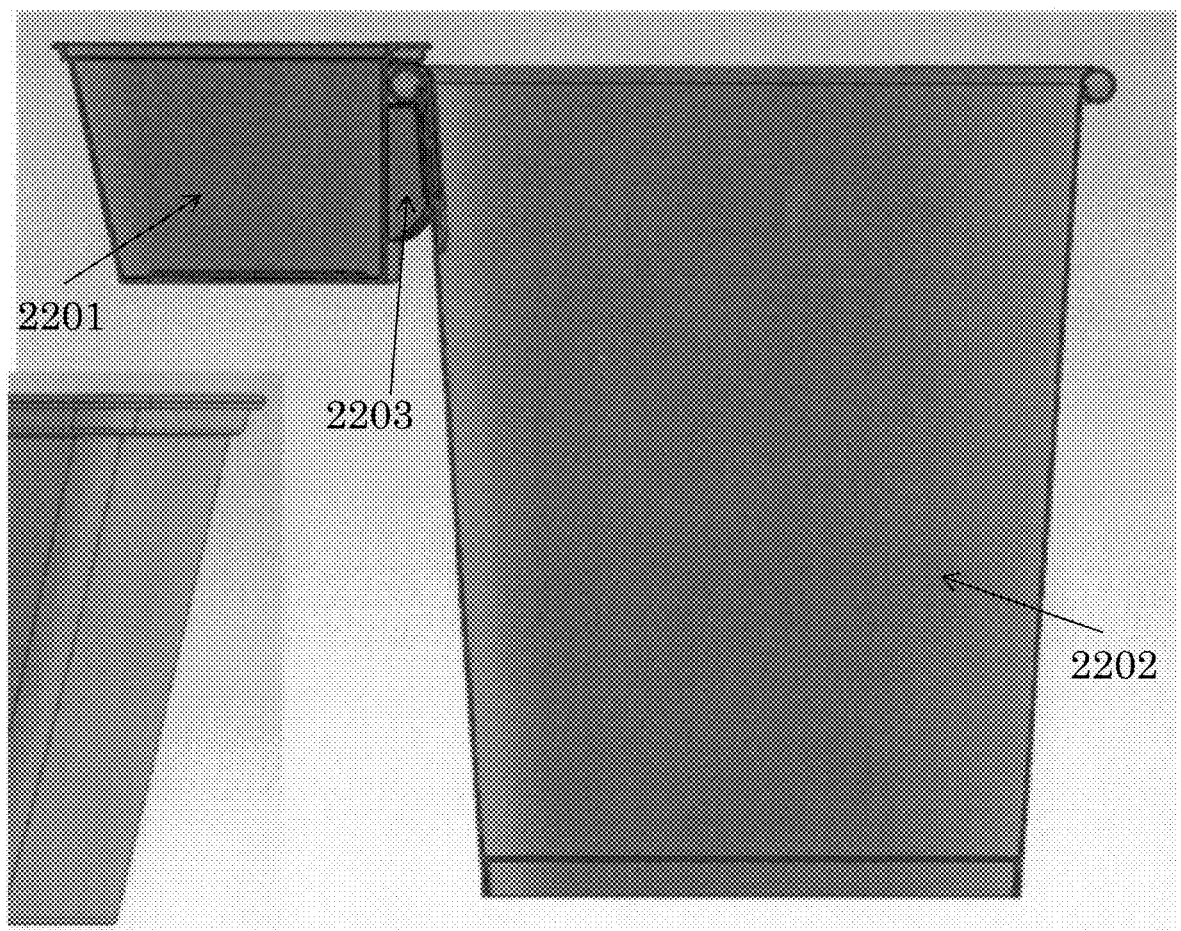
FIG. 22 shows a side view of the condiment cup hanging on a food container.

FIG. 22 shows a side view of the condiment cup hanging on a food container. The condiment cup 2201 hangs on the food container 2202 using the one clip. The condiment cup 2201 has a back slant that is substantially similar to the inward slant of the food container 2202 to bring the condiment cup 2201 into contact with the side of the food container 2202. In this example, the condiment cup 2201 includes a bump out, for example, 2203, giving the condiment cup 2201 the back slant that is substantially similar to the inward slant of the food container 2202.

Figure 23:
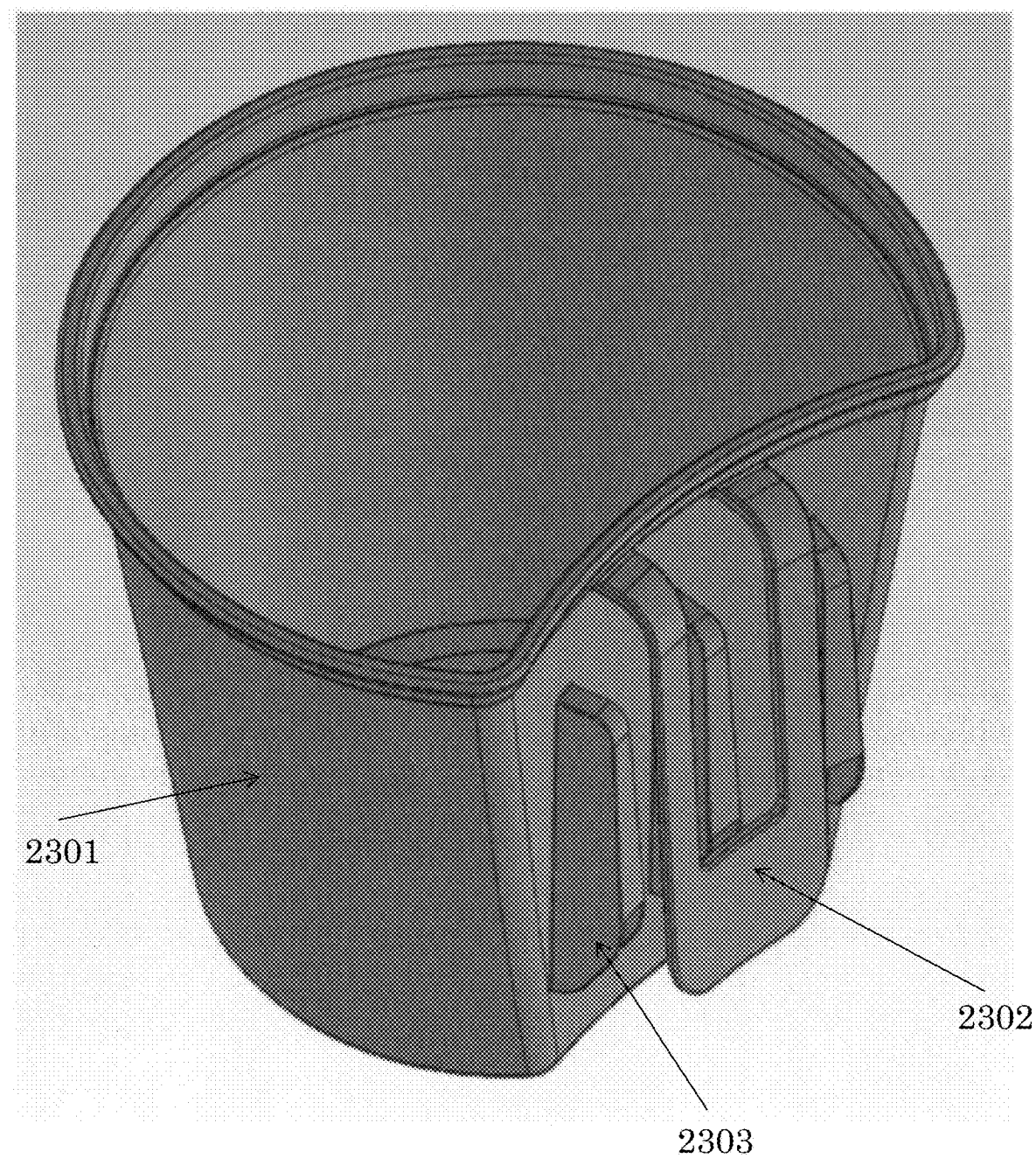
FIG. 23 shows a view of the clip of the condiment cup.

FIG. 23 shows a view of the clip of the condiment cup. The condiment cup 2301 has one clip 2302 and a bump out, for example, 2303. The bump out, for example 2303, provides the condiment cup 2301 the back slant that is substantially similar to the inward slant of the food container.

Figure 24:
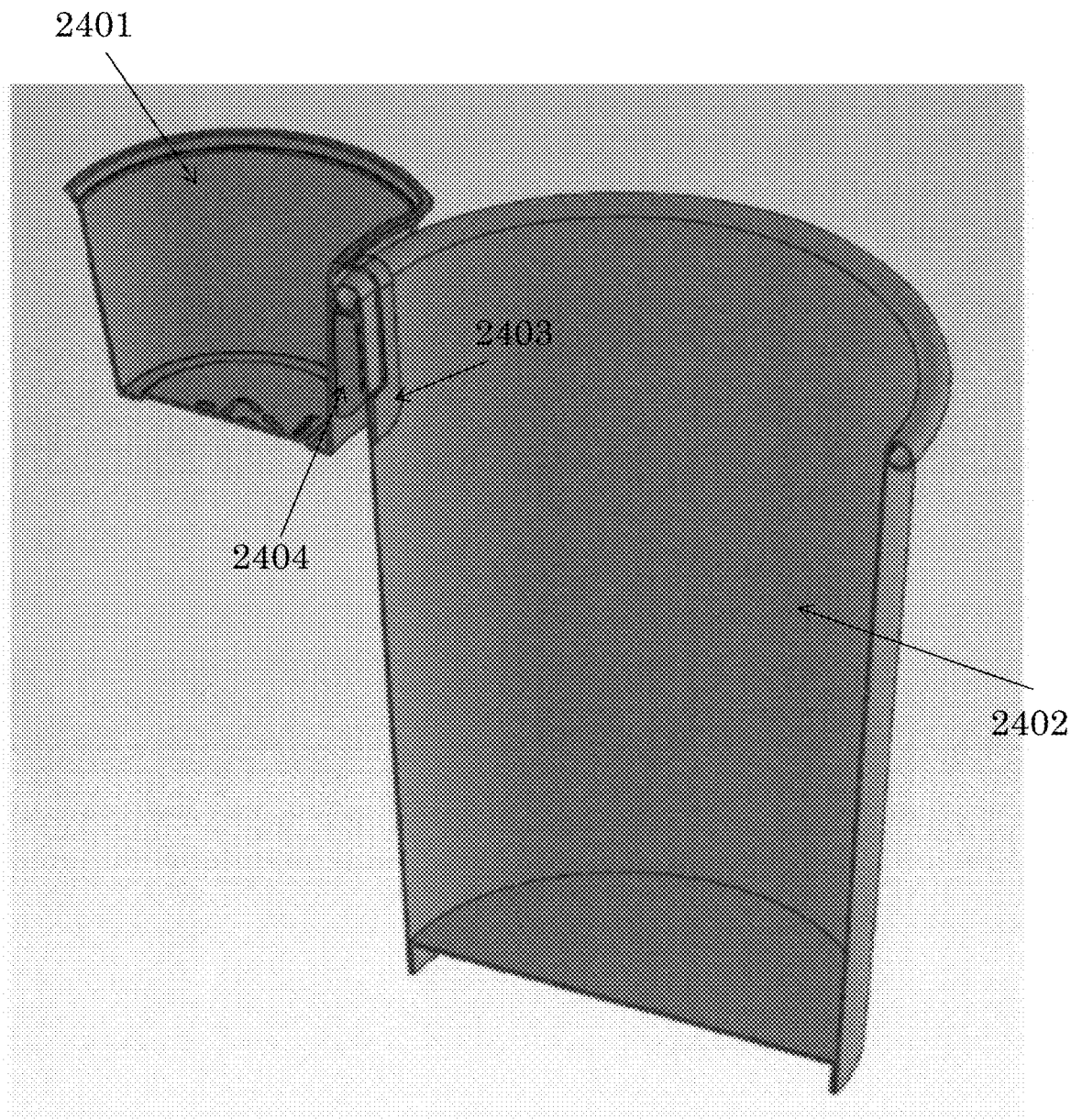
FIG. 24 shows a cross section of the condiment cup hanging on a food container.

FIG. 24 shows a cross section of the condiment cup hanging on a food container. The condiment container 2401 hangs on the food container 2402 using the one clip 2403. The condiment cup 2401 has a back slant that is substantially similar to the inward slant of the food container 2402 to bring the condiment cup 2401 into contact with the side of the food container 2402. In this example, the condiment cup 2401 includes a bump out, for example, 2404, giving the condiment cup 2401 the back slant that is substantially similar to the inward slant of the food container 2402.

Figure 25:
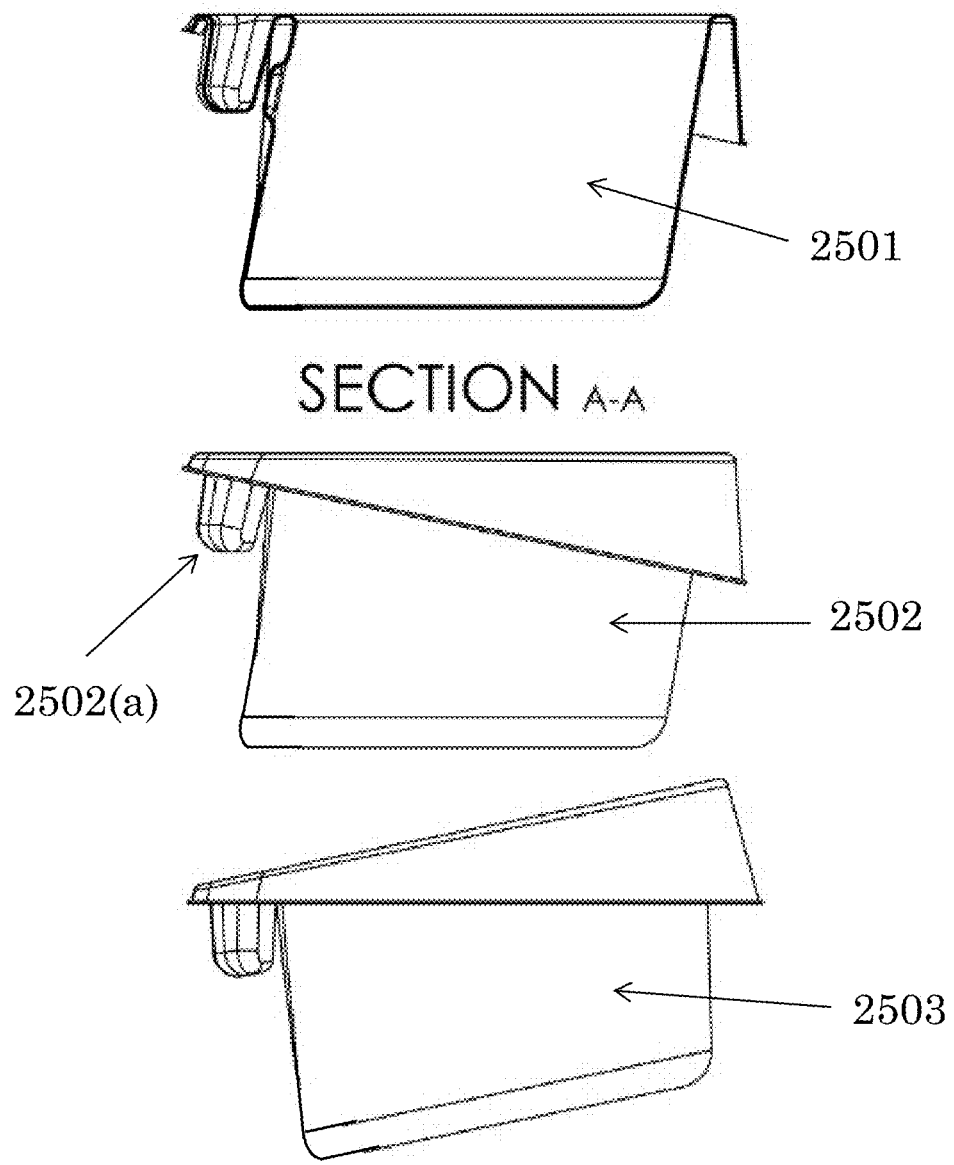
FIG. 25 shows an embodiment of the condiment cup with one clip.

FIG. 25 shows an embodiment of the condiment cup with one clip. The condiment cup 2502 has one clip 2502(a) for hanging the condiment cup 2502 on a food container. The condiment cup 2502 has a back slant that is substantially similar to the inward slant of the food container to bring the condiment cup 2502 into contact with the side of the food container.

The condiment cup 2501 shows a cross section of the condiment cup 2502. The condiment cup 2503 illustrates the backslant which enables the center of gravity of the combined food container and condiment cup 2503 to remain inside the food container. This reduces the risk of the food container from falling over as the internal volume of food decreases.

Figure 26:
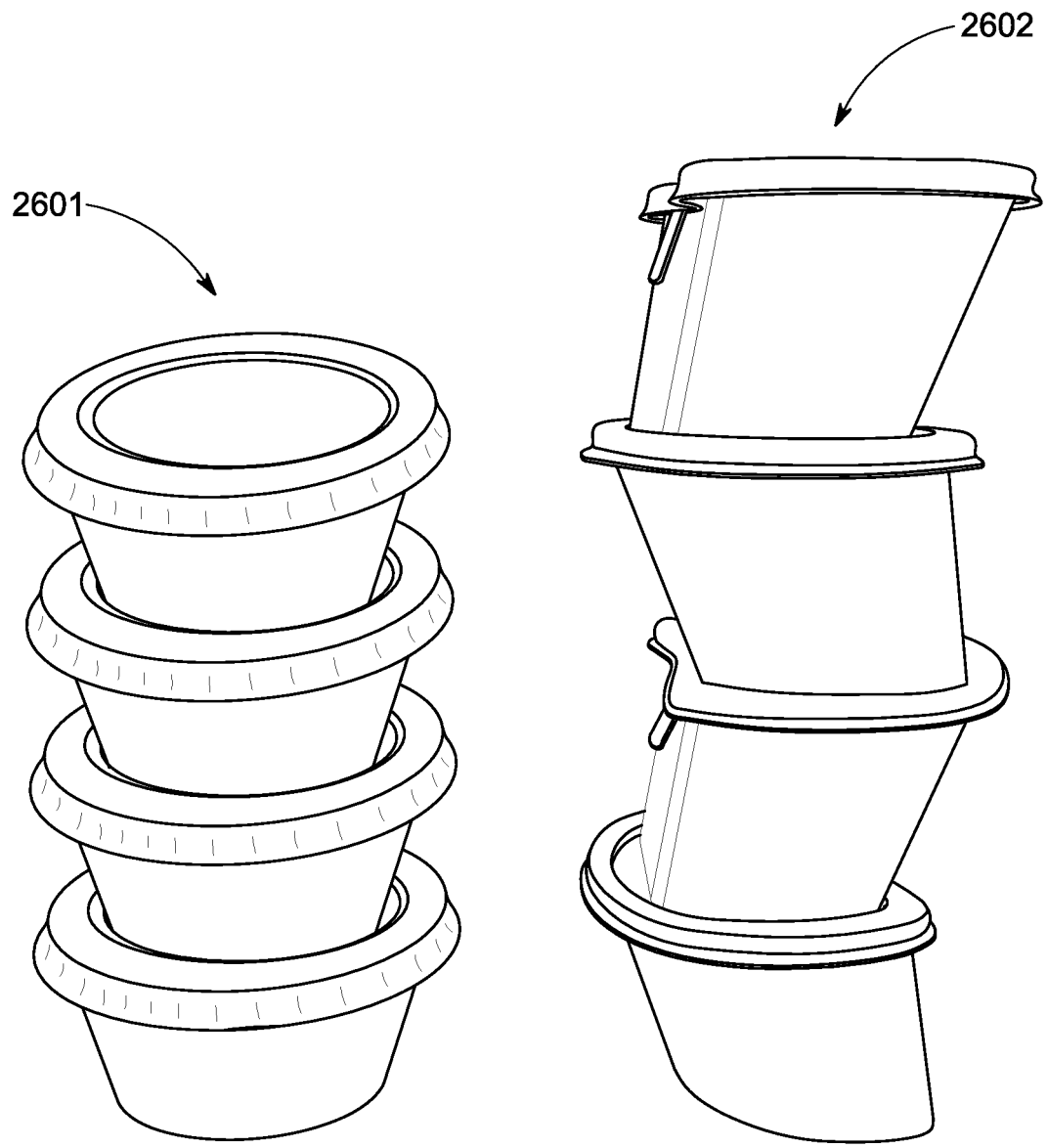
FIG. 26 shows a stack of the condiment cups.

FIG. 26 shows a stack of the condiment cups. In FIG. 26, both a basic stack of condiment cups 2601 and a stack of condiment cups 2602 as described herein are shown. In the basic stack of condiment cups 2601, the condiment cups are stacked one on top of the other. In the stack of condiment cups 2602 as described herein, the condiment cups are stacked on top of one another in a front-to-back order. The lid of the condiment cups, described herein, may allow for the condiment cups, described herein, to be stacked in the manner illustrated in FIG. 26. The backslant of the condiment, described herein, may prevent them from being stacked more than four high, for example, as the angle created would be too large. However, by stacking them front-to-back, as shown in FIG. 26, the center of gravity is stabilized and the condiment cups may be stacked higher, for example eight high. The stacking of the condiment cups with the lid attached is beneficial for vendors when prepping the cups for use. For example, by filling the condiment cups with a condiment, such as cheese, prior to use, a vendor can quickly complete a consumer's order.

In another embodiment, the removable lid may be a sealed foil lid enabling the entire hanging condiment cup to be heated prior to consumption. The hanging condiment cup may be made of a biodegradable material that is refrigerator and microwave safe. The hanging condiment cup may also be made of polypropylene (PP), high-density polyethylene (HDPE), polystyrene (PS) or other plastic material.

One embodiment of the hanging condiment cup may have at least one integral clip configured high enough on the convex back end so the hanging condiment cup will create a substantially level surface with the food container.

In an embodiment, there may be two integral clips used to attach to food container. The integral clips may be flat or curved to match the radius of the container. The integral clips may extend down into the cup far enough to secure the hanging condiment cup to the edge of the food container while not interfering with the food or beverage in the container. The integral clip or clips may be wider than they are long, and may extend the entire length of the convex back end of the hanging condiment cup.

In an embodiment, the clip may be wider than it is long, measuring at least 20 millimeters of the circumference of the food container.

In an embodiment, the condiment cup may attach to a beverage container, such as a pint glass, in order to carry a smaller volume of beverage different than the beverage in the beverage container to which the condiment cup is attached. For example, a shot of one type of alcohol may be placed in the condiment cup and attached to the side of a pint glass in order to mix the shot with the contents of the pint glass prior to consumption.

The condiment cup may be made using a manufacturing process, for example, injection molding, thermoforming, or the like.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A hanging condiment cup for attaching a condiment to a uniformly tapered food container, the condiment cup comprising:
   a cup having: a bottom wall, a flange around a top edge of the cup, one horizontally convex front wall, wherein the exterior of the front wall is horizontally convex and one horizontally concave back wall, wherein the exterior of the back wall is horizontally concave;
   at least one integral clip with two points of attachment to the horizontally concave back wall of the cup below the flange;
   wherein the integral clip has a horizontal top portion extending perpendicularly from the back wall of the cup, and a downwardly extending portion depending from the horizontal top portion to form an obtuse angle between the top portion and the downwardly extending portion;
   wherein the downwardly extending portion of the integral clip has a length, defined by the horizontal top portion and a bottom end, and a width, defined by two sides, that is substantially uniform along the length of the downwardly extending portion;
   wherein the horizontally concave back wall of the cup has a horizontal radius that is substantially similar to that of the uniformly tapered food container;
   wherein the back wall of the condiment cup has a uniform inward slant in a vertical plane that is substantially similar to a slant of the uniformly tapered food container;
   wherein a first angle formed between the backwall and a bottom of the condiment cup is an acute angle and is supplementary to a second angle that is an obtuse angle formed between a bottom and a side wall of the uniformly tapered food container; and
   wherein the cup and integral clip are configured to create a gap between the downwardly extending portion of the clip and the back wall of the cup in order to receive the uniformly tapered food container, the gap increasing in depth from a top end of the downwardly extending portion to the bottom end, and to nest with a plurality of other condiment cups of the same type for storage and shipping.

2. The hanging condiment cup of claim 1, wherein the bottom wall of the cup has a raised indentation in the middle of the cup, and wherein, in a nested arrangement of two or more hanging condiment cups, the raised indentation of a first cup substantially interfaces with the raised indentation of the second cup.

3. The hanging condiment cup of claim 1, wherein the condiment cup has a removable lid with a pull tab and wherein the removable lid has an indented rim that fits an internal perimeter of the flange.

4. The hanging condiment cup of claim 1, wherein the cup has a removable foil lid or a lid of a similar material as the cup.

5. The hanging condiment cup of claim 1, wherein a removable lid fits around the flange of the hanging condiment cup.

6. The hanging condiment cup of claim 1, wherein a removable lid fits inside the flange of the hanging condiment cup.

7. The hanging condiment cup of claim 1, wherein the bottom wall of the cup is configured to stack with a lid of a second hanging condiment cup, the lid having a raised center portion that requires stacking in a front-to-back arrangement.

8. The hanging condiment cup of claim 1, wherein the bottom end of the downwardly extending portion of the integral clip deviates angularly away from the back wall of the cup.

* * * * *